W. J. RUFF.
CAR COUPLING.
APPLICATION FILED NOV. 13, 1917.
1,278,754.
Patented Sept. 10, 1918.
2 SHEETS—SHEET 1.
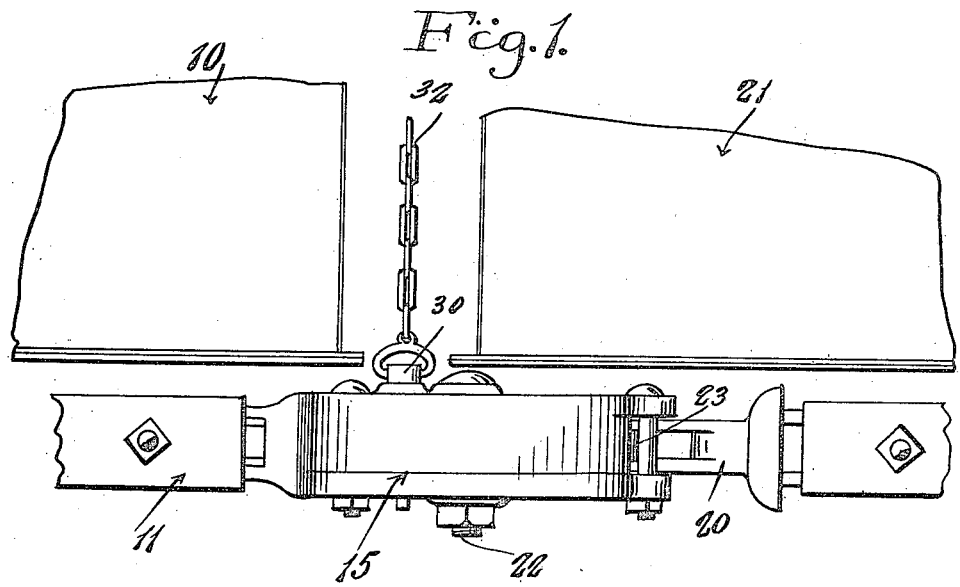
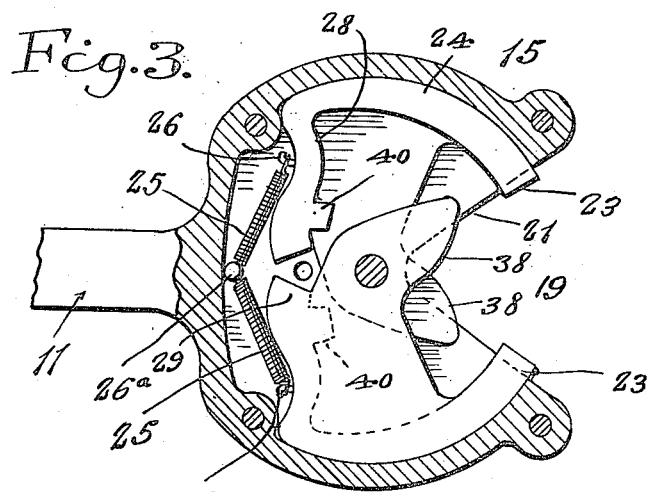
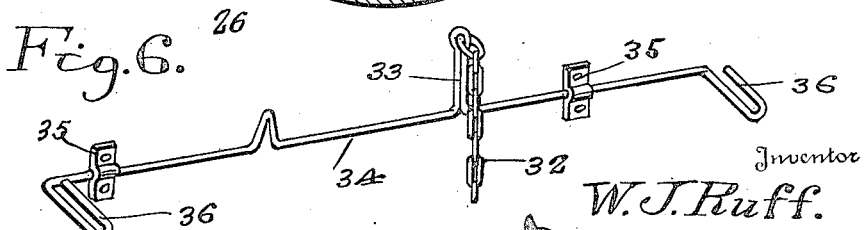
Inventor
W. J. Ruff.

W. J. RUFF.
CAR COUPLING.
APPLICATION FILED NOV. 13, 1917.
1,278,754.
Patented Sept. 10, 1918.
2 SHEETS—SHEET 2.
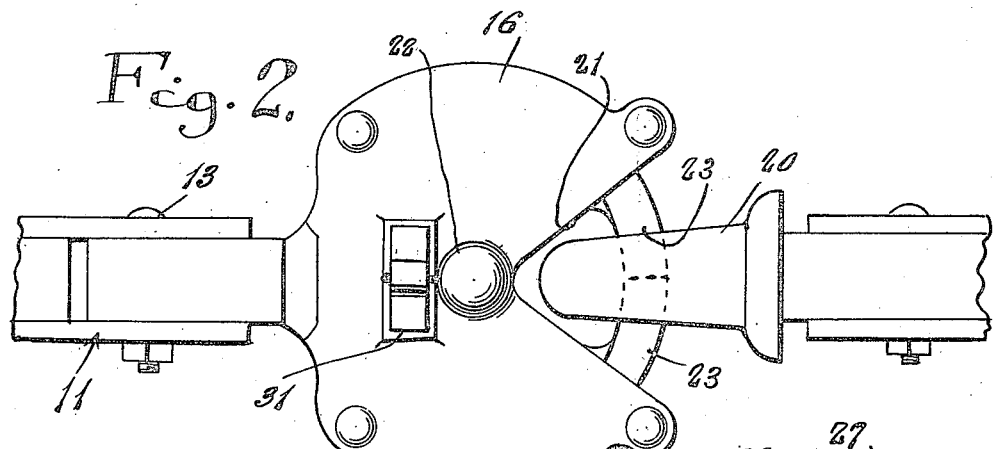
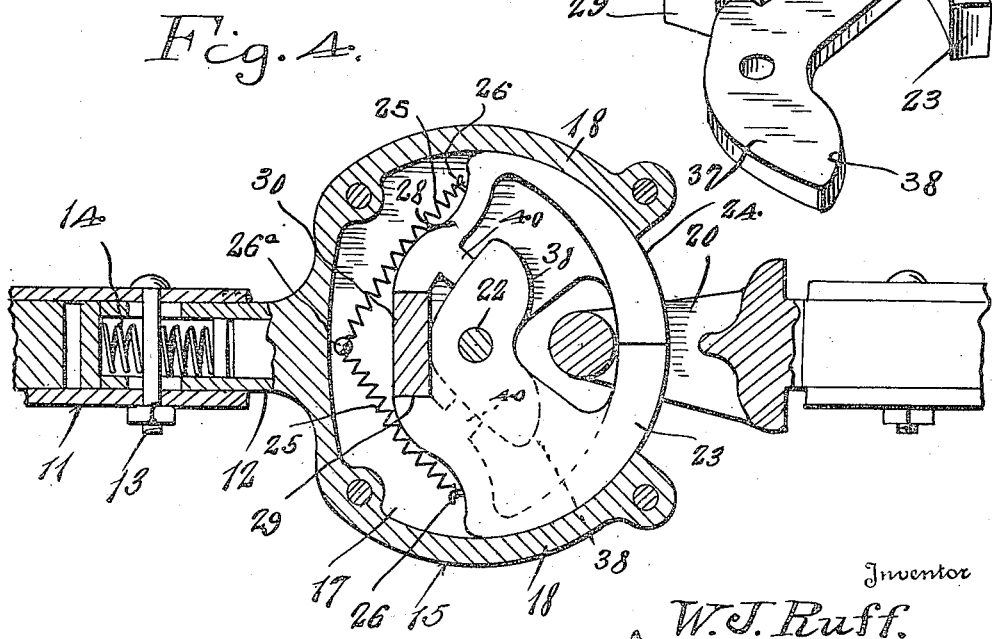
Inventor
W. J. Ruff.

UNITED STATES PATENT OFFICE.

WILLIAM J. RUFF, OF JOHNSTON CITY, ILLINOIS.

CAR-COUPLING.

1,278,754.
Specification of Letters Patent.
Patented Sept. 10, 1918.

Application filed November 13, 1917. Serial No. 201,799.

*To all whom it may concern:*

Be it known that I, WILLIAM J. RUFF, a citizen of the United States, residing at Johnston City, in the county of Williamson and State of Illinois, have invented certain new and useful Improvements in Car-Couplings; and I do hereby declare the following to be a full, clear, and exact description of the invention, such as will enable others skilled in the art to which it appertains to make and use the same.

This invention has for its object to provide an improved coupler primarily designed for coupling mine cars, although the invention is not necessarily limited to this use.

Another object is the provision of a coupler including a pair of pivoted jaws supported in the drawhead, which are automatically closed about the coupling link by contact therewith.

Another object is the provision of a car coupler in which the pivot pin for the jaws is relieved of considerable strain incident to the pull upon the jaws and is distributed over the drawhead.

With these and other objects in view, the invention consists in the novel construction, combination and arrangement of parts as will be hereinafter specifically described, claimed and illustrated in the accompanying drawings, in which:

Figure 1 represents a fragmentary side elevation of the adjacent ends of two cars, showing the coupler applied to use, Fig. 2 represents a plan view of the coupler detached, Fig. 3 represents a fragmentary sectional view through the drawhead, illustrating the jaws in open position, Fig. 4 represents a detail sectional view, showing the jaws in closed position, Fig. 5 represents a perspective view of one of the jaws removed, and Fig. 6 represents a detail perspective view of the actuating device for the locking key.

Referring to the drawings in detail, wherein similar reference numerals designate corresponding parts throughout the several views, the numeral 10 indicates a fragment of a car under which is supported the drawbar, consisting of the two sections 11 and 12, which are coupled together by a bolt 13 co-acting with a spring 14, which normally retains the outer bar section 12 in outwardly extended position. The outer draw-bar section 12 is rigidly connected with the hollow drawhead 15, consisting of the top and bottom walls 16 and 17, respectively, and the substantially semicircular side walls 18, which terminate in spaced relation to provide the entrance opening 19 for the reception of the coupling link 20, carried by another car 21. Intermediate the spaced terminals of the semicircular side walls 18, the top and bottom walls 16 and 17 are provided with substantially V-shaped recesses 21 to accommodate the links 20.

A pivot pin 22 is rigidly secured in vertical position in the top and bottom walls of the drawhead 15 and is arranged concentrically between the curved side walls 18. A pair of curved coupling jaws 23 are pivotally supported upon the pin or bolt 22 and the outer curved edges 24 thereof are disposed concentric with the pivot pin 22, and slidably bear against the inner surface of the curved side walls 18 of the drawhead. The jaws 23 are normally retained in open position by coil springs 25, each of which is secured at one end to a lug 26 formed upon the jaw, and at its opposite end to an attaching lug 26ª formed interiorly of the drawhead 15.

The top part of one of the jaws 23 is cutaway, and the lower part of the other jaw is cutaway, as indicated at 27, in order that the two jaws may be snugly fittted in the drawhead 15. The rear or inner edges of the jaws 23 are formed with reinforcing flanges 28, which terminate in opposed shoulders 29 for engagement with a polygonal key 30 slidable vertically through the drawhead 15, whereby the jaws 23 are rigidly locked in closed position, as clearly shown in Fig. 4. When the key 30 is withdrawn from the drawhead the jaws 23 are automatically opened by the tension of the springs 25 and assume the position shown in Fig. 3.

The key 30 is fitted in openings 31 formed in the top and bottom walls 16 and 17, respectively, of the drawhead 15, and said key is connected by a chain 32 with the crank arm 33 of a shaft 34, which latter is supported in bearings 35 attached to the end of the car 10. The terminals of the shaft 34 are preferably extended outwardly to a point adjacent the sides of the car 10, and are provided with operating handles 36 for convenience in rotating the shaft 34 to withdraw the key 30 from the drawhead 15, so as to release the jaws 23.

The pivoted terminals of the jaws 23 are directed angularly, as indicated at 37, and provided with curved or cam surfaces 38, which, when the jaws are open assume the position shown in Fig. 3, so that when contacted by the coupling link 20, the pressure exerted upon the cam surfaces 38 automatically closes the jaws and secures the links.

Each flange 28 of the jaws 23 is formed with a lug or abutment 40 for engagement with the angular pivoted terminal 37 of the other jaw. The lugs 40 co-act with the abutting terminals of the jaws to limit the closing movement of the latter.

What I claim is:

1. A car coupler including a hollow drawhead, jaws pivotally supported in the drawhead, reinforcing flanges carried by the jaws, lugs formed on the flanges, and angular terminals carried by the pivoted ends of the jaws adapted to engage the lugs to limit the closing movement of the jaws.

2. A car coupler including a hollow drawhead, a pair of jaws pivotally supported in the drawhead, reinforcing flanges carried by the jaws terminating in opposed shoulders, a key slidable vertically through the drawhead adapted to engage the shoulders to lock the jaws in closed position, said jaws having angular pivoted terminals, and lugs formed on the reinforcing flanges adapted to be engaged by the angular terminals of the jaws to limit the closing movement of the latter.

In testimony whereof I affix my signature in presence of two witnesses.

WILLIAM J. RUFF.

Witnesses:
JAMES H. COLOMBO,
FRED WITTE.

Copies of this patent may be obtained for five cents each, by addressing the "Commissioner of Patents, Washington, D. C."